(12) United States Patent
Kim

(10) Patent No.: US 10,659,826 B2
(45) Date of Patent: May 19, 2020

(54) CLOUD STREAMING SERVICE SYSTEM, IMAGE CLOUD STREAMING SERVICE METHOD USING APPLICATION CODE, AND DEVICE THEREFOR

(71) Applicant: SK PLANET CO., LTD., Seongnam-si, Gyeonggi-Do (KR)

(72) Inventor: Dong-Gook Kim, Suwon-si (KR)

(73) Assignee: SK PLANET CO., LTD., Seongnam-si, Gyeonggi-Do (KR)

(*) Notice: Subject to any disclaimer, the term of this patent is extended or adjusted under 35 U.S.C. 154(b) by 186 days.

(21) Appl. No.: 15/532,377

(22) PCT Filed: Mar. 4, 2015

(86) PCT No.: PCT/KR2015/002073
§ 371 (c)(1),
(2) Date: Aug. 23, 2017

(87) PCT Pub. No.: WO2016/088940
PCT Pub. Date: Jun. 9, 2016

(65) Prior Publication Data
US 2018/0115790 A1    Apr. 26, 2018

(30) Foreign Application Priority Data
Dec. 2, 2014 (KR) .................. 10-2014-0170423

(51) Int. Cl.
*H04N 21/235* (2011.01)
*H04N 21/431* (2011.01)
(Continued)

(52) U.S. Cl.
CPC ......... *H04N 21/2353* (2013.01); *G06F 16/95* (2019.01); *G06T 13/80* (2013.01);
(Continued)

(58) Field of Classification Search
None
See application file for complete search history.

(56) References Cited

U.S. PATENT DOCUMENTS

2003/0195923 A1    10/2003    Bolch et al.
2008/0313545 A1    12/2008    Patel et al.
(Continued)

FOREIGN PATENT DOCUMENTS

JP    2006236323 A    9/2006
JP    2008097621 A    4/2008
(Continued)

OTHER PUBLICATIONS

International Search Report for PCT/KR2015/002073 dated Jul. 30, 2015.
(Continued)

*Primary Examiner* — Younes Naji
(74) *Attorney, Agent, or Firm* — Fenwick & West LLP (57) ABSTRACT

A cloud streaming service system, an image cloud streaming service method using an application code, and a device therefor are disclosed. A still-image-based cloud streaming service can be performed by receiving a first code corresponding to an application result screen image from a web application server, generating a capture image by using image region attribute information included in the first code, still-image-encoded capture image and a second code generated so as to include animation information by converting the first code, such that the user terminal can generate the application result screen image. A cloud streaming server does not have to perform unnecessary rendering and does not perform animation processing, thereby enabling the number of web containers operable in the server to increase.

14 Claims, 5 Drawing Sheets

(51) Int. Cl.
    *H04N 21/81*     (2011.01)
    *H04N 21/236*     (2011.01)
    *H04N 21/20*     (2011.01)
    *H04N 21/2343*     (2011.01)
    *H04N 21/472*     (2011.01)
    *H04N 21/239*     (2011.01)
    *H04N 21/8545*     (2011.01)
    *G06F 16/95*     (2019.01)
    *G06T 13/80*     (2011.01)
    *H04N 21/61*     (2011.01)

(52) U.S. Cl.
    CPC ........... *H04N 21/20* (2013.01); *H04N 21/236* (2013.01); *H04N 21/2393* (2013.01); *H04N 21/23439* (2013.01); *H04N 21/4312* (2013.01); *H04N 21/4318* (2013.01); *H04N 21/47217* (2013.01); *H04N 21/6125* (2013.01); *H04N 21/8153* (2013.01); *H04N 21/8545* (2013.01)

(56) References Cited

U.S. PATENT DOCUMENTS

| | | |
|---|---|---|
| 2010/0269135 A1 | 10/2010 | Hulse et al. |
| 2011/0179106 A1 | 7/2011 | Hulse et al. |
| 2012/0051713 A1* | 3/2012 | Myung ................. G11B 27/034 386/225 |
| 2012/0265802 A1* | 10/2012 | Shen ....................... H04L 67/02 709/203 |
| 2012/0287118 A1* | 11/2012 | Mizutani ............ H04N 21/2743 345/419 |
| 2012/0306851 A1* | 12/2012 | Maloney ................. G06T 13/20 345/419 |
| 2013/0179787 A1 | 7/2013 | Brockmann et al. |
| 2014/0026023 A1* | 1/2014 | Cabanier ............... G06F 16/986 715/202 |
| 2014/0325362 A1 | 10/2014 | Potts et al. |

FOREIGN PATENT DOCUMENTS

| | | |
|---|---|---|
| KR | 100676621 B1 | 1/2007 |
| KR | 1020100113503 A | 10/2010 |

OTHER PUBLICATIONS

Extended European Search Report dated Nov. 16, 2017 in connection with the counterpart European Patent Application No. 15864490.6.

* cited by examiner

FIG. 8

CLOUD STREAMING SERVICE SYSTEM, IMAGE CLOUD STREAMING SERVICE METHOD USING APPLICATION CODE, AND DEVICE THEREFOR

CROSS-REFERENCE TO RELATED APPLICATION

This present application is a national stage filing under 35 U.S.C. § 371 of PCT application number PCT/KR2015/002073 filed on Mar. 4, 2015 which is based upon and claims the benefit of priority to Korean Patent Application Nos. 10-2014-0170423 filed on Dec. 2, 2014 in the Korean Intellectual Property Office. The disclosures of the above-listed applications are hereby incorporated by reference herein in their entirety.

TECHNICAL FIELD

The present invention relates to a cloud streaming service system, a cloud streaming service method using an application code, and an apparatus for the same, and more particularly to a cloud streaming service system, method and server for creating a capture image by using an application code and then transmitting a conversion code together with the capture image to a user such that a user terminal can create an application result screen to which an animation effect is applied.

BACKGROUND

With the recent growth of Internet technology, the speed of communication using a personal mobile communication device has been rapidly improved. This realizes the Internet environment capable of downloading and uploading a large amount of data through a remote computer access or performing local login to a remote computer. In addition, as a variety of applications are developed for a mobile communication terminal such as a smart phone, many virtualization technologies are being introduced to drive applications requiring higher performance in a user terminal having relatively lower performance. A cloud streaming service based on screen virtualization is an interesting one of them. In this service, a server executes an application, compresses an execution screen through video encoding, and transmits the compressed video to a client. Then the client can play the received video as if the application is running at the client.

Basically, this cloud streaming service employs cloud streaming technique based on a video codec. By the way, even in case of providing a certain service such as a menu display, the entire screen is unnecessarily captured and operated using the video codec. This results in inefficiency throughout the system.

Accordingly, there is a need for enhanced technology of creating a service screen having an animation effect in a user's set-top box by rendering only a necessary minimum part of an execution result screen of an application executed at a user's request and, even when a dynamic effect such as animation is applied, by transmitting animation-related information to the set-top box separately from images so that unnecessary images are not captured.

A relevant technique is disclosed in Korean Patent Publication No. 10-2010-0113503 (Title: System and method for storing program code and data within an application hosting center) published on Oct. 21, 2010.

SUMMARY

An object of the present invention is to provide an improved cloud streaming service in which a cloud streaming server omits a process of comparing differences of frames to create an image to be captured and instead acquires an image at a code end.

Another object of the present invention is to increase the number of web containers capable of running in a server by requiring no unnecessary animation processing when an application result screen is processed.

Still another object of the present invention is to enable a user terminal to apply an animation effect even when a web application developer writes an application code of a desired form in a typical manner rather than a code of In order to achieve the above objects, a cloud streaming server according to the present invention comprises a code receiving unit configured to receive a first code corresponding to an application result screen from a web application server; a capturing unit configured to create a capture image by using image region attribute information included in the first code; an encoding unit configured to perform still image encoding of the capture image by using a still image compression technique; and a sending unit configured to perform a cloud streaming service based on a still image by transmitting, to a user terminal, the still-image-encoded capture image and a second code created to include animation information through conversion of the first code such that the user terminal creates the application result screen.

In the cloud streaming server, the capturing unit may be further configured to create the capture image by performing rendering for input information corresponding to the image region attribute information included in the first code.

The cloud streaming server may further comprise a capture image information creating unit configured to create capture image information by using the image region attribute information included in the first code; an animation information creating unit configured to create animation information by using an animation code included in the first code; and a code converting unit configured to convert the first code into the second code including the capture image information and the animation information.

In the cloud streaming server, the capturing unit may be further configured to create the capture image by rendering only a part of the application result screen.

In the cloud streaming server, the second code may include the animation information corresponding to at least one of an animation type, an animation applying duration, an animation repetition count, a start coordinate, an end coordinate, a start size, and an end size.

In the cloud streaming server, the second code may include no animation code.

In the cloud streaming server, the encoding unit may bes further configured to perform the still image encoding of the capture image by using the still image compression technique corresponding to one of portable network graphics (PNG), paletted PNG, and joint photography experts group (JPEG).

Additionally, an image cloud streaming service method using an application code according to the present invention comprises steps of receiving a first code corresponding to an application result screen from a web application server; creating a capture image by using image region attribute information included in the first code; performing still image encoding of the capture image by using a still image compression technique; and performing a cloud streaming service based on a still image by transmitting, to a user terminal, the still-image-encoded capture image and a second code created to include animation information through conversion of the first code such that the user terminal creates the application result screen.

In the method, the step of creating the capture image may include creating the capture image by performing rendering for input information corresponding to the image region attribute information included in the first code.

The method may further comprise steps of creating capture image information by using the image region attribute information included in the first code; creating animation information by using an animation code included in the first code; and converting the first code into the second code including the capture image information and the animation information.

In the method, the step of creating the capture image may include creating the capture image by rendering only a part of the application result screen.

In the method, the second code may include the animation information corresponding to at least one of an animation type, an animation applying duration, an animation repetition count, a start coordinate, an end coordinate, a start size, and an end size.

In the method, the second code may include no animation code.

In the method, the step of performing the still image encoding may include performing the still image encoding of the capture image by using the still image compression technique corresponding to one of portable network graphics (PNG), paletted PNG, and joint photography experts group (JPEG).

Additionally, as another technical solution, the present invention provides a computer program, stored in a medium, for executing the aforesaid method.

Additionally, a cloud streaming system comprises a cloud streaming server configured to receive a first code corresponding to an application result screen from a web application server, to create a capture image by using image region attribute information included in the first code, and to perform a cloud streaming service based on a still image by transmitting, to a user terminal, the capture image still-image-encoded by using a still image compression technique and a second code created to include animation information by converting the first code; and a terminal configured to receive an application execution result screen corresponding to the cloud streaming server from the cloud streaming server.

According to the present invention, the cloud streaming server can provide an improved cloud streaming service by omitting a process of comparing differences of frames to create an image to be captured and instead acquiring an image at a code end.

In addition, the present invention can increase the number of web containers capable of running in the server by requiring no unnecessary animation processing when an application result screen is processed.

In addition, the present invention can provide a cloud streaming service that enables a user terminal to apply an animation effect even through a web application developer writes an application code of a desired form in a typical manner rather than a code of a new form.

DETAILED DESCRIPTION

Hereinafter, preferred embodiments of the present invention will be described with reference to the accompanying drawings. However, in the following description and accompanying drawings, well known functions or elements may not be described or illustrated in detail to avoid obscuring the subject matter of this invention. Through the drawings, the same reference numerals denote corresponding elements if possible.

The terms and words used in the following description and claims are not limited to the bibliographical meanings and are merely used by the inventor to enable a clear and consistent understanding of the invention. Accordingly, it should be apparent to those skilled in the art that the following description of exemplary embodiments of this invention is provided for illustration purpose only and not for the purpose of limiting the invention as defined by the appended claims and their equivalents. Additionally, the expressions "first", "second", etc. used for specifying various elements are used for distinguishing one element from other elements and do not limit the corresponding elements.

Figure 1:
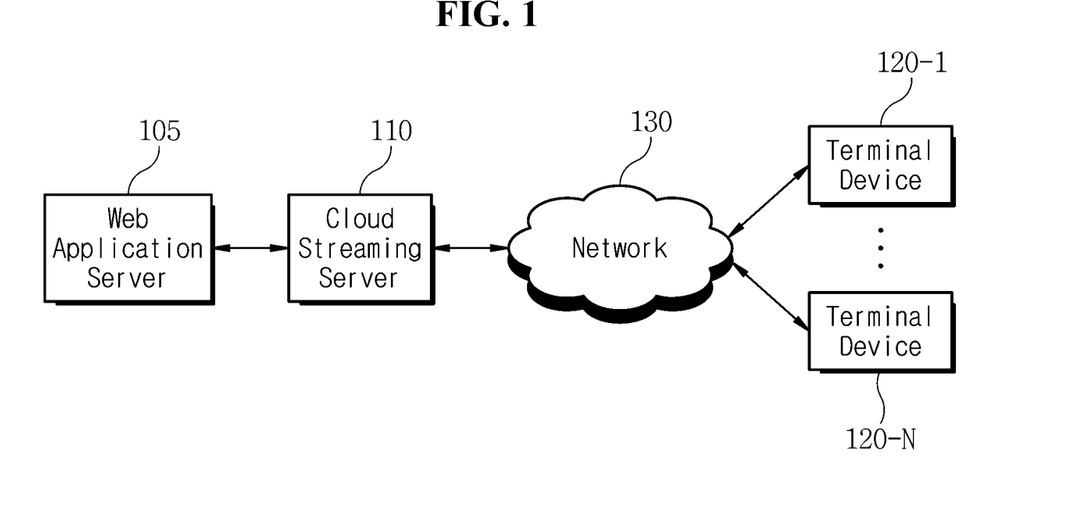
FIG. 1 is a block diagram illustrating a cloud streaming service system according to an embodiment of the present invention.

FIG. 1 is a block diagram illustrating a cloud streaming service system according to an embodiment of the present invention.

Referring to FIG. 1, the cloud streaming service system according to an embodiment of this invention includes a web application server 105, a cloud streaming server 110, terminal devices 120-1 . . . 120-N, and a network 130.

The web application server 105 is a server that receives a request from the terminal devices 120-1 . . . 120-N and processes the received request. The web application server 105 can structurally separate and process a function thereof through web containers rather than process all the requests received from the terminal devices 120-1 . . . 120-N. Therefore, the more there are service requests from the terminal devices 120-1 . . . 120-N, the more effective a service method using the web application server 105 may be. For example, WEB LOGIC of BEA, Web Spere of IBM, JEUS of T-max, Tomcat, Jboss of RedHot, and the like may correspond to the web application server 105.

Based on the service request received from the terminal devices 120-1 . . . 120-N, the web application server 105 may transmit an application code corresponding to an application result screen to the cloud streaming server 110.

The cloud streaming server 110 receives a first code corresponding to the application result screen from the web application server 105.

In addition, the cloud streaming server 110 may create capture image information by using image region attribute information included in the first code.

In addition, the cloud streaming server 110 may create animation information by using an animation code included in the first code.

In addition, the cloud streaming server 110 may convert the first code into a second code that includes the capture image information and the animation information. The second code may include the animation information that corresponds to at least one of an animation type, an animation applying duration, an animation repetition count, a start coordinate, an end coordinate, a start size, and an end size. Alternatively, the second code may not include the animation code.

In addition, the cloud streaming server 110 creates the capture image by using the image region attribute information included in the first code. In order to create the capture image, rendering may be performed for input information corresponding to the image region attribute information included in the first code. Also, rendering may be performed for only a part of the application result screen in order to create the capture image.

In addition, the cloud streaming server 110 performs still image encoding of the capture image by using a still image compression technique. The still image compression technique used for the still image encoding of the capture image may correspond to one of portable network graphics (PNG), paletted PNG, and joint photography experts group (JPEG).

Additionally, the cloud streaming server 110 performs a cloud streaming service based on a still image by transmitting, to a user terminal, the still-image-encoded capture image and the second code created to include the animation information through conversion of the first code such that the terminal devices 120-1 . . . 120-N can create the application result screen.

The terminal devices 120-1 . . . 120-N receive an application execution result screen corresponding to the cloud streaming service from the cloud streaming server 110 and then provide it to users.

Each of the terminal devices 120-1 . . . 120-N is an apparatus connected to a communication network and capable of executing an application, based on a cloud computing system. The terminal devices may be, but not limited to, mobile communication terminals, information communication devices, multimedia devices, wired devices, stationary devices, and internet protocol (IP) devices. Also, each of the terminal devices 120-1 . . . 120-N may be a mobile device having various mobile communication specifications, such as a mobile phone, a portable multimedia player (PMP), a mobile internet device (MID), a smart phone, a desktop, a tablet PC, a notebook, a net book, a personal digital assistant (PDA), a smart TV, and an information communication device.

The network 130, including a typically used network and any future developable network, offers a route of delivering data between the cloud streaming server 110 and the terminal devices 120-1 . . . 120-N. For example, the network 130 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 130 is not limited to the existing transmission scheme standard, and may include all transmission scheme standards to be developed in the future.

Also, in FIG. 1, the network used between the cloud streaming server 110 and the terminal devices 120-1 . . . 120-N may be different from or identical with a network used between the terminal devices 120-1 . . . 120-N.

Figure 2:
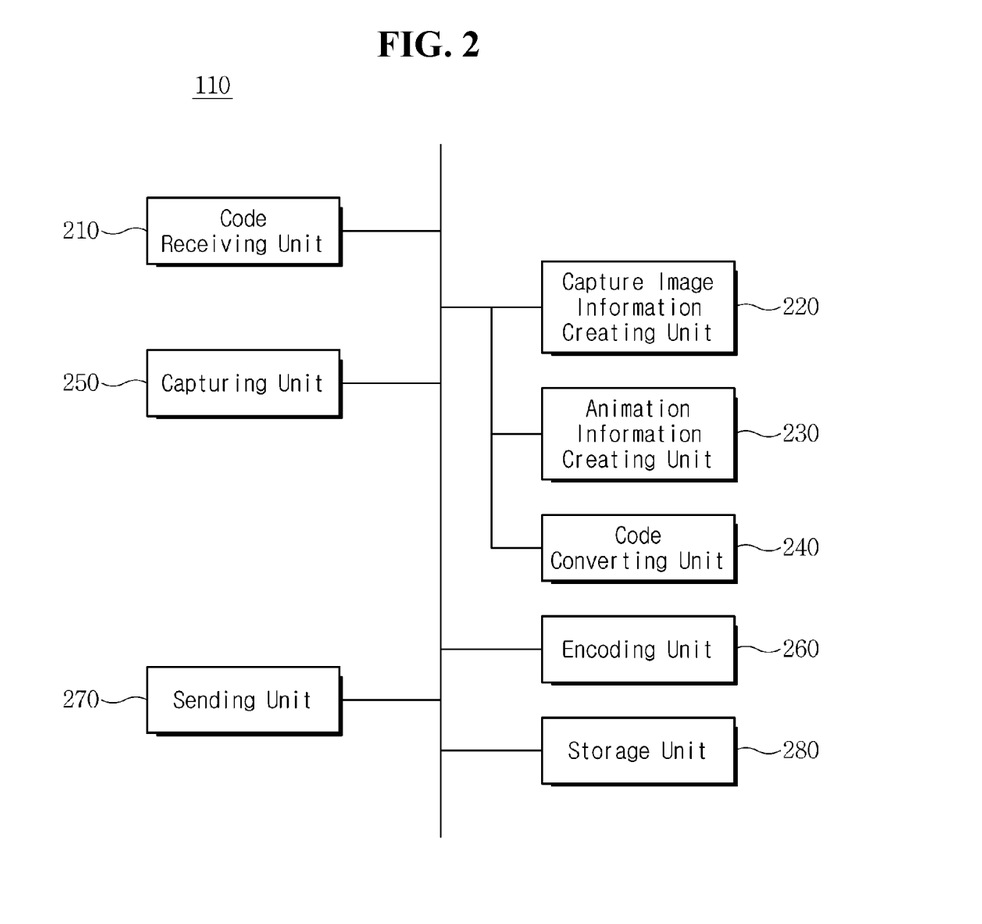
FIG. 2 is a block diagram illustrating an example of a cloud streaming server shown in FIG. 1.

FIG. 2 is a block diagram illustrating an example of the cloud streaming server shown in FIG. 1.

Referring to FIG. 2, the cloud streaming server 110 shown in FIG. 1 includes a code receiving unit 210, a capture image information creating unit 220, an animation information creating unit 230, a code converting unit 240, a capturing unit 250, an encoding unit 260, a sending unit 270, and a storage unit 280.

The code receiving unit 210 receives the first code corresponding to the application result screen from the web application server. The first code may include an animation code about an animation effect applied when an application is executed, image region attribute information about images to which the animation effect is applied, and the like. Also, the first code may be written in a manner typically used by web application developers. For example, the first code may be written using a library such as jQuery which is widely used for animation purposes.

The capture image information creating unit 220 creates capture image information by using the image region attribute information included in the first code. For example, the image region attribute information may be coordinate information for an image to be captured.

The animation information creating unit 230 creates animation information by using the animation code included in the first code. The animation code included in the first code is a code for executing an animation, and there is a case of having to perform an unnecessary capture when the code is executed. Therefore, checking the contents of the animation code and using extractable information, the animation information can be created.

The code converting unit 240 converts the first code into the second code including the capture image information and the animation information. Therefore, by checking the second code, detailed information about a capture region and an animation may be comprehended.

The second code may include the animation information corresponding to at least one of an animation type, an animation applying duration, an animation repetition count, a start coordinate, an end coordinate, a start size, and an end size. For example, in the second code, the animation type may be represented as 'effect type', the animation applying duration may be represented as 'duration', the animation repetition count may be represented as 'isRepeat', the start coordinate may be represented as 'start X, start Y', the end coordinate may be represented as 'end X, end Y', the start size may be represented as 'start W, start H', and the end size may be represented as 'end W, end H'.

Alternatively, the second code may not include the animation code.

The capturing unit 250 creates the capture image by using the image region attribute information included in the first code. At this time, the capturing unit may directly read and acquire an image corresponding to the image region attribute information without performing a process of capturing the image. For example, in case of rendering an application result screen and then capturing a part corresponding to the image region attribute information in the rendered screen, this may be inefficient because server resources are used to perform rendering or capturing. Therefore, the image corresponding to the image region attribute information may be read and created in information received from the web application server.

In addition, the capturing unit may create the capture image by performing rendering for input information corresponding to the image region attribute information included in the first code. For example, the capturing unit may create the capture image by rendering only a part corresponding to the capture image in the first code by using the image region attribute information.

In addition, the capturing unit may create the capture image by rendering only a part of the application result screen. For example, in case of a general rendering, the entire application result screen may be rendered, and a process of comparing a difference between respective regions may be performed to detect a part to be captured. However, since such processes need resources of the cloud streaming server 110, it may be difficult to simultaneously process many service requests. Therefore, in order to create the capture image, rendering may be performed for only a part including the capture image in the entire application result screen.

The encoding unit 260 performs still image encoding of the capture image by using a still image compression technique.

At this time, the encoding unit may perform the still image encoding of the capture image by using a still image compression technique corresponding to one of portable network graphics (PNG), paletted PNG, and joint photography experts group (JPEG).

The PNG still image compression technique may have a good quality of an encoded image, but may increase a data size, thus causing a decrease in transmission speed when a transmission network has a lower bandwidth.

The paletted PNG still image compression technique may guarantee a transmission speed because of a reduced data size of an encoded image, but may cause deterioration of an image quality because of a color expression with 8 bits.

The JPEG still image compression technique may greatly reduce the amount of transmission data because of high compression efficiency, but may cause a greater system load when encoding and decoding are performed.

The sending unit 270 performs a cloud streaming service based on a still image by transmitting, to a user terminal, the still-image-encoded capture image and the second code created to include the animation information through conversion of the first code such that the user terminal can create the application result screen. For example, even though the cloud streaming server 110 can completely create and stream the application result screen, it is possible to remarkably reduce a load of the cloud streaming server 110 by using the above transmission scheme such that the user terminal can create the application result screen. The reduced load of the cloud streaming server 110 increases the number of services that can be simultaneously processed by the cloud streaming server 110. Therefore, more users can receive services at the same time.

Figure 3:
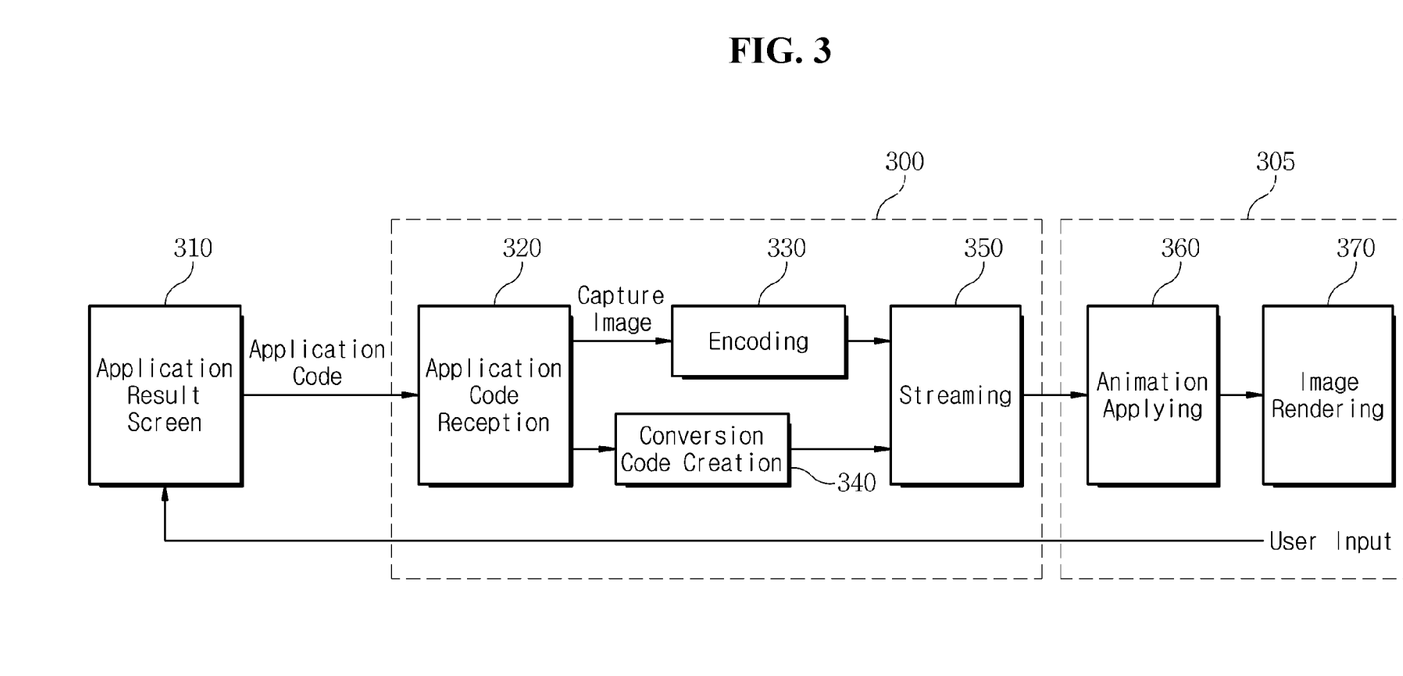
FIG. 3 is a diagram illustrating a cloud streaming service based on a still image according to an embodiment of the present invention.

FIG. 3 is a diagram illustrating a cloud streaming service based on a still image according to an embodiment of the present invention.

Referring to FIG. 3, in an embodiment of this invention, processes of performing a cloud streaming service based on a still image may be divided into a process performed in a cloud streaming server 300 and a process performed in a user terminal 305.

The cloud streaming server 300 may perform the reception 320 of an application code corresponding to an application result screen 310 created by an application server in response to a user's request. At this time, the application code is the first code and may include image region attribute information, an animation code, and the like.

Thereafter, the cloud streaming server may create a capture image by using the image region attribute information included in the application code, and then perform encoding 330 of the created capture image. At this time, depending on an image type included in the image region attribute information, the capture image may be acquired through direct reading or by performing the minimum rendering using the image region attribute information. For example, an image of a PNG type may be directly read and encoded.

Further, the cloud streaming server may create capture image information and animation information by respectively using the image region attribute information and the application code which are included in the application code.

Thereafter, by converting the application code, the cloud streaming server may perform the creation 340 of a conversion code including capture image information and animation information. At this time, the conversion code is the second code and may include the animation information rather than the animation code.

The cloud streaming server 300 may perform streaming 350 of both the encoded capture image 330 and the second code (i.e., the conversion code) to the user terminal 305. At this time, the capture image and the conversion code may be contained in one message and then transmitted, or respectively contained in corresponding messages and then transmitted.

The user terminal 305 may create an application result screen by using the capture image and the conversion code received from the cloud streaming server 300. Namely, based on the animation information and the capture image information included in the conversion code, the user terminal may apply an animation 360 to the capture image. In this case, since the animation information includes information such as an animation type, an animation applying duration, an animation repetition count, a start coordinate, an end coordinate, a start size, and an end size, the animation may be accurately and easily applied to the capture image to create the application result screen.

The user terminal 305 may output the created application result screen to the user through image rendering 370.

Figure 4:
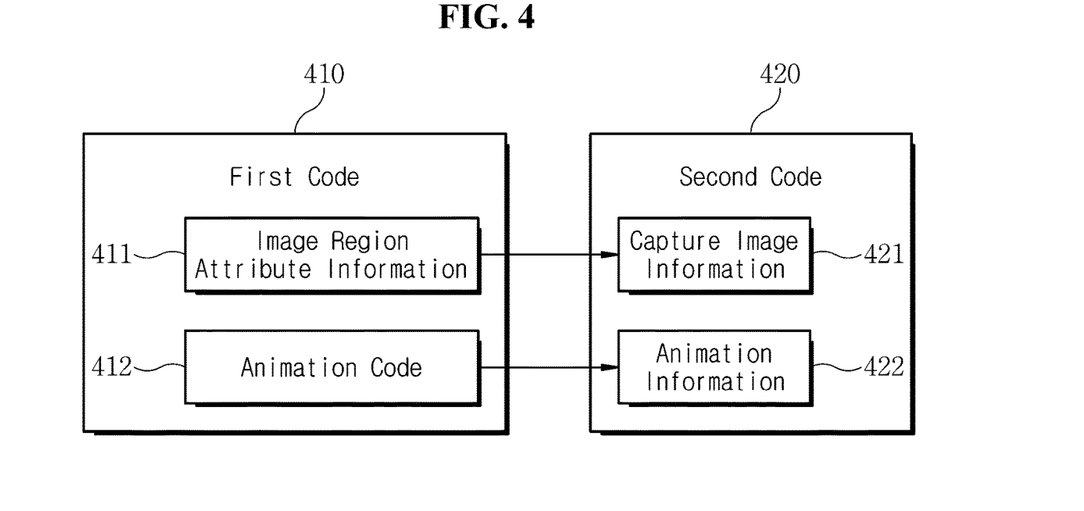
FIG. 4 is a diagram illustrating first and second codes according to an embodiment of the present invention.

FIG. 4 is a diagram illustrating first and second codes according to an embodiment of the present invention.

Referring to FIG. 4, in an embodiment of this invention, the first code 410 includes image region attribute information 411 and an animation code 412, and the second code 420 includes capture image information 421 and animation information 422.

The first code 410 may be an application code that corresponds to the application result screen received from the web application server. Therefore, the image region attribute information 411 may be information about a part to which the animation is applied in the application result screen, and the animation code 412 may be a code about an animation effect applied to the part corresponding to the image region attribute information 411.

The second code 420 may include the capture image information 421 created using the image region attribute information 411 and the animation information 422 created using the animation code 412. Therefore, the second code 420 may be transmitted to the user terminal so that the user terminal can create the application result screen corresponding to the first code 410.

Figure 5:
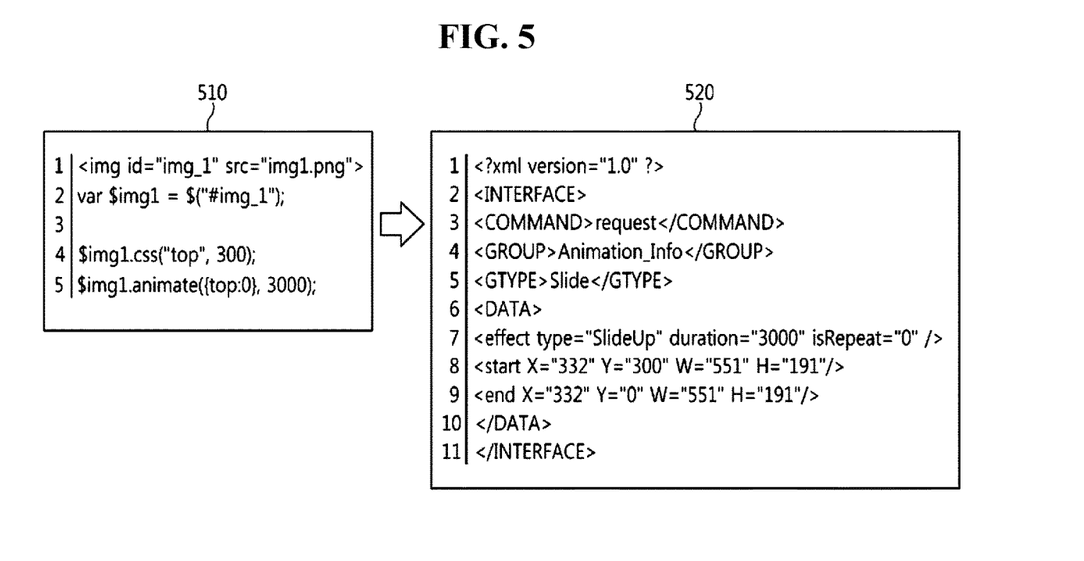
FIG. 5 is a diagram illustrating a code conversion according to an embodiment of the present invention.

FIG. 5 is a diagram illustrating a code conversion according to an embodiment of the present invention.

Referring to FIG. 5, it can be seen that the first code 510 is converted into the second code 520.

In this example, the first code 510 is written by utilizing a library such as jQuery, etc. which is used for animation purposes. The first code 510 includes the attributes of a region to be captured, as shown in the first and second lines, and the animation code as shown in the fourth and fifth lines. Namely, the first code 510 may be interpreted as applying the SlideUp animation to 'img1.png'. Based on this interpretation, the first code 510 may be converted into the second code 520 to include the capture image information and the animation information.

For example, the second code 520 shows, in the seventh to ninth lines, that the animation type is 'SlideUp', the applying duration is '3000', the repetition count is '0', the start coordinate is '332, 300', the start size is '551, 191', the end coordinate is '332, 0', and the end size is '551, 191'. Like this example, the second code 520 includes coordinate information about the capture image and animation information such as type, applying duration, and repetition count such that the user terminal can create the application result screen containing an animation by using the second code 520.

In addition, the capture image to be transmitted to the user terminal along with the second code 520 may be extracted directly from the first code 510. For example, 'img1.png' may be extracted from the first code 510 and stored as a capture image, and the capture image may be transmitted to the user terminal together with the created second code 520.

Figure 6:
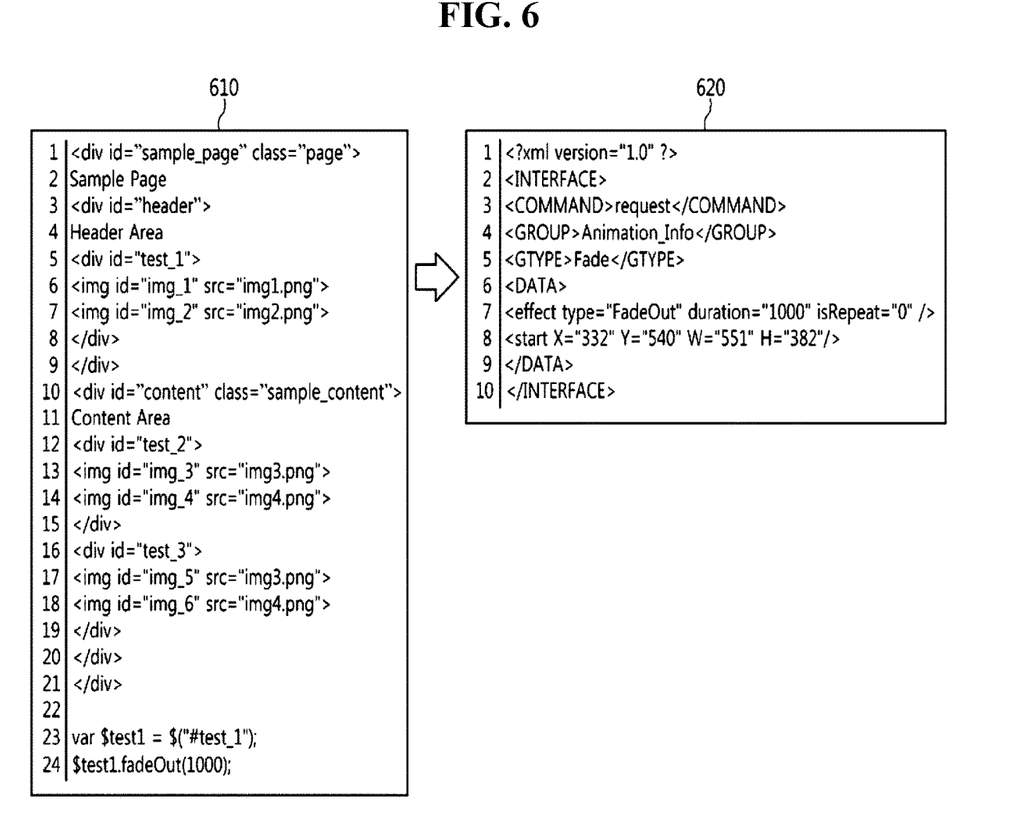
FIG. 6 is a diagram illustrating a code conversion according to another embodiment of the present invention.

FIG. 6 is a diagram illustrating a code conversion according to another embodiment of the present invention.

Referring to FIG. 6, the first code 610 is composed of a test_1 code area having img1.png and img2.png, a test_2 code area having img3.png and img4.png, and a test_3 code area having img5.png and img6.png. As shown in the 23rd and 24th lines of the first code 610, a fadeout animation is applied to the test_1 code area.

Therefore, when the first code 610 is converted into the second code 620, the second code 620 may be created using only the test_1 code area having img1.png and img2.png corresponding to the capture image.

In this case, the capture image may be created by directly making an image from 'div id="test_1"' only. By directly creating the capture image like this, a process of capturing the application result screen or a process of comparing the captured screen with other area may be omitted. Therefore, resources of the cloud streaming server can be saved.

In addition, the capture image to be transmitted to the user terminal together with the second code 620 may be acquired by storing the result of rendering a partial code of the first code 610 as an image. For example, a capture image corresponding to 'img1.png' and 'img2.png' may be acquired by rendering the fifth to eighth lines in the first code 610, and the acquired capture image may be delivered to the user terminal together with the second code 620.

Figure 7:
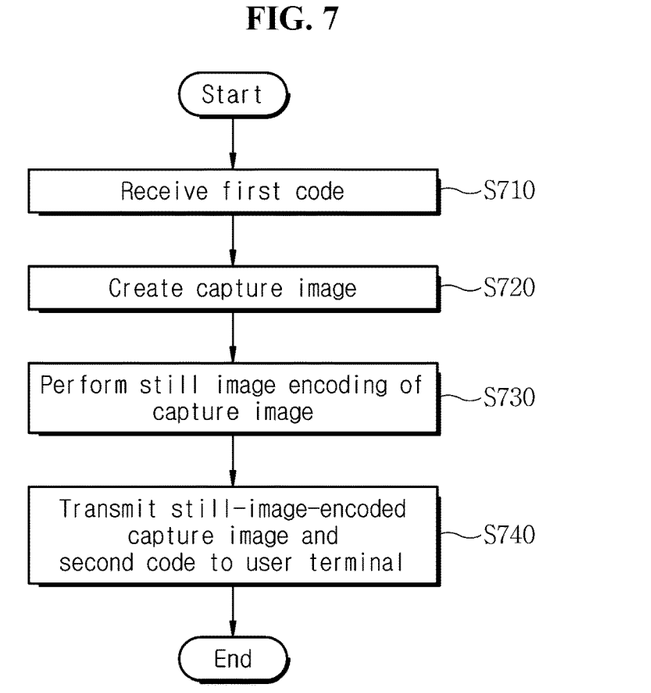
FIG. 7 is a flow diagram illustrating an image cloud streaming service method using an application code according to an embodiment of the present invention.

FIG. 7 is a flow diagram illustrating an image cloud streaming service method using an application code according to an embodiment of the present invention.

Referring to FIG. 7, in an embodiment of this invention, the image cloud streaming service method using an application code receives a first code corresponding to an application result screen from a web application server (S710). The first code may include an animation code about an animation effect applied when an application is executed, image region attribute information about images to which the animation effect is applied, and the like. Also, the first code may be written in a manner typically used by web application developers. For example, the first code may be written using a library such as jQuery which is widely used for animation purposes.

In addition, the image cloud streaming service method using an application code creates a capture image by using the image region attribute information included in the first code (S720). At this time, the method may directly read and acquire an image corresponding to the image region attribute information without performing a process of capturing the image. For example, in case of rendering an application result screen and then capturing a part corresponding to the image region attribute information in the rendered screen, this may be inefficient because server resources are used to perform rendering or capturing. Therefore, the image corresponding to the image region attribute information may be read and created in information received from the web application server.

In addition, the method may create the capture image by performing rendering for input information corresponding to the image region attribute information included in the first code. For example, the method may create the capture image by rendering only a part corresponding to the capture image in the first code by using the image region attribute information.

In addition, the method may create the capture image by rendering only a part of the application result screen. For example, in case of a general rendering, the entire application result screen may be rendered, and a process of comparing a difference between respective regions may be performed to detect a part to be captured. However, since such processes need resources of the cloud streaming server, it may be difficult to simultaneously process many service requests. Therefore, in order to create the capture image, rendering may be performed for only a part including the capture image in the entire application result screen.

In addition, the image cloud streaming service method using an application code performs still image encoding of the capture image by using a still image compression technique (S730).

At this time, the method may perform the still image encoding of the capture image by using a still image compression technique corresponding to one of portable network graphics (PNG), paletted PNG, and joint photography experts group (JPEG).

The PNG still image compression technique may have a good quality of an encoded image, but may increase a data size, thus causing a decrease in transmission speed when a transmission network has a lower bandwidth.

The paletted PNG still image compression technique may guarantee a transmission speed because of a reduced data size of an encoded image, but may cause deterioration of an image quality because of a color expression with 8 bits.

The JPEG still image compression technique may greatly reduce the amount of transmission data because of high compression efficiency, but may cause a greater system load when encoding and decoding are performed.

In addition, the image cloud streaming service method using an application code performs a cloud streaming service based on a still image by transmitting, to a user terminal, the still-image-encoded capture image and the second code created to include the animation information through conversion of the first code such that the user terminal can create the application result screen (S740). For example, even though the cloud streaming server can completely create and stream the application result screen, it is possible to remarkably reduce a load of the cloud streaming server by using the above transmission scheme such that the user terminal can create the application result screen. The reduced load of the cloud streaming server increases the number of services that can be simultaneously processed by the cloud streaming server. Therefore, more users can receive services at the same time.

In this case, the second code may include the animation information corresponding to at least one of an animation type, an animation applying duration, an animation repetition count, a start coordinate, an end coordinate, a start size, and an end size. For example, in the second code, the animation type may be represented as 'effect type', the animation applying duration may be represented as 'duration', the animation repetition count may be represented as 'isRepeat', the start coordinate may be represented as 'start X, start Y', the end coordinate may be represented as 'end X, end Y', the start size may be represented as 'start W, start H', and the end size may be represented as 'end W, end H'.

Alternatively, the second code may not include the animation code.

Although not shown in FIG. 7, the image cloud streaming service method using an application code creates capture image information by using the image region attribute information included in the first code. For example, the image region attribute information may be coordinate information for an image to be captured.

In addition, although not shown in FIG. 7, the image cloud streaming service method using an application code creates animation information by using the animation code included in the first code. The animation code included in the first code is a code for executing an animation, and there is a case of having to perform an unnecessary capture when the code is executed. Therefore, checking the contents of the animation code and using extractable information, the animation information can be created.

In addition, although not shown in FIG. 7, the image cloud streaming service method using an application code converts the first code into the second code including the capture image information and the animation information. Therefore, by checking the second code, detailed information about a capture region and an animation may be comprehended.

Figure 8:
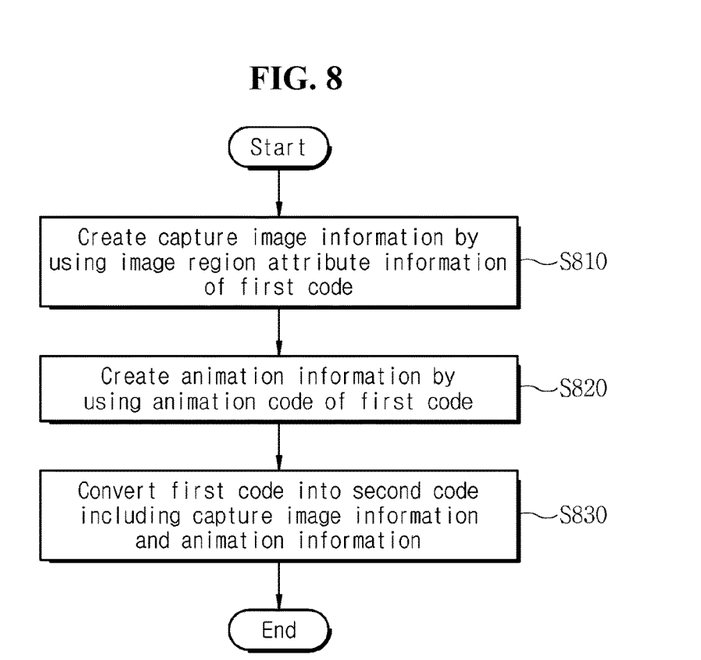
FIG. 8 is a flow diagram illustrating a code conversion process according to an embodiment of the present invention.

FIG. 8 is a flow diagram illustrating a code conversion process according to an embodiment of the present invention.

Referring to FIG. 8, in an embodiment of this invention, the code conversion process creates capture image information by using image region attribute information included in a first code received from a web application server (S810).

The first code may include an animation code about an animation effect applied when an application is executed, image region attribute information about images to which the animation effect is applied, and the like. Also, the first code may be written in a manner typically used by web application developers. For example, the first code may be written using a library such as jQuery which is widely used for animation purposes.

In addition, the code conversion process creates animation information by using the animation code included in the first code (S820). The animation code included in the first code is a code for executing an animation, and there is a case of having to perform an unnecessary capture when the code is executed. Therefore, using the contents of the animation code, the animation information to be transmitted to a user terminal can be created.

In addition, the code conversion process converts the first code into a second code including the capture image information and the animation information (S830). Therefore, by using the second code, the user terminal can create an application screen in which an animation is applied to a capture image.

The second code may include the animation information corresponding to at least one of an animation type, an animation applying duration, an animation repetition count, a start coordinate, an end coordinate, a start size, and an end size. For example, in the second code, the animation type may be written as an identifier of 'effect type', the animation applying duration may be written as an identifier of 'duration', the animation repetition count may be written as an identifier of 'isRepeat', the start coordinate may be written as an identifier of 'start X, start Y', the end coordinate may be written as an identifier of 'end X, end Y', the start size may be written as an identifier of 'start W, start H', and the end size may be written as an identifier of 'end W, end H'. The animation information may be represented by allocating values to such respective identifiers. Alternatively, the second code may not include the animation code.

The image cloud streaming service method using the application code according to the present invention may be implemented in the form of program commands which may be executed through various computer means. Such program commands may be recorded on a computer-readable recording medium, which may include a program command, a data file, a data structure, etc. alone or in combination. The program command recorded on the medium is designed or configured especially for the invention, or known to those skilled in computer software. The computer-readable recording medium includes magnetic media such as a hard disk, a floppy disk, and a magnetic tape, optical media such as a CD-ROM and a DVD, magneto-optical media such as a floptical disk, and hardware devices specially configured to store and perform a program command, such as a ROM, a RAM, a flash memory and the like. In addition, the program commands may include high-class language codes, which can be executed in a computer by using an interpreter, as well as machine codes made by a compiler. This hardware device may be configured to operate as one or more software modules in order to perform the operation of this invention, and vice versa.

According to this invention, the cloud streaming service system, the cloud streaming service method using the application code, and the apparatus for the same are not limited to the above-discussed embodiments, all or parts of which may be selectively combined to make various modifications.

According to the present invention, it is possible to provide a cloud streaming service based on a still image by receiving a first code corresponding to an application result screen from a web application server, creating a capture image by using image region attribute information included in the first code, and performing still image encoding of the capture image by using a still image compression technique, and transmitting, to a user terminal, the still-image-encoded capture image and a second code created to include animation information through conversion of the first code such that the user terminal creates the application result screen. Further, this invention can provide a cloud streaming service that enables a user terminal to apply an animation effect even though a web application developer writes an application code of a desired form in a typical manner rather than a code of a new form, thus helping the convenience of service provider.

What is claimed is:
1. A cloud streaming server comprising:
a processor;

a memory storing instructions thereon, the instructions when executed by the processor cause the processor to:

receive a first code corresponding to an application result screen from a web application server;

capture an image by using image region attribute information included in the first code;

perform still image encoding of the captured image by using a still image compression technique to generate a still-image-encoded capture image;

convert the first code to a second code including animation information created using an animation code in the first code, wherein the animation information includes type of animation to be applied to the still-image-encoded capture image, a duration during which the animation is applied, an animation repetition count, a start coordinate, an end coordinate, a start size, and an end size; and perform a cloud streaming service based on a still image by transmitting, to a user terminal, the still-image-encoded capture image and the second code such that the user terminal creates the application result screen.

2. The cloud streaming server of claim 1. wherein the instructions further cause the processor to capture the image by performing rendering for input information corresponding to the image region attribute information included in the first code.

3. The cloud streaming server of claim 2, wherein the instructions further cause the processor to:

create capture image information by using the image region attribute information included in the first code; and convert the first code into the second code including the capture image information and the animation information.

4. The cloud streaming server of claim 3, wherein the instructions further cause the processor to create the captured image by rendering only a part of the application result screen.

5. The cloud streaming server oil claim 3. wherein the second code includes no animation code.

6. The cloud streaming server of claim 1, wherein the instructions further cause the processor to perform the still image encoding of the captured image by using the still image compression technique corresponding to one of portable network graphics (PNG), paletted PNG, and joint photography experts group (JPEG).

7. An image cloud streaming service method using an application code, the method comprising:

receiving a first code corresponding to an application result screen from a web application server;

capturing an image by using image region attribute information included in the first code; performing still image encoding of the captured image by using a still image compression technique to generate a still-image-encoded capture image;

converting the first code to a second code including animation information created using an animation code in the first code, wherein the animation information includes a type of animation to be applied to the still-image- encoded capture image, a duration during which the animation is applied an animation repetition count, a start coordinate, an end coordinate, a start size, and an end size; and performing a cloud streaming service based on a still image by transmitting, to a user terminal, the still-image-encoded capture image and the second code such that the user terminal creates the application result screen.

8. The method of claim 7, wherein capturing the image includes creating the capture image by performing rendering for input information corresponding to the image region attribute infomation included in the first code.

9. The method of claim 8, further comprising:

creating capture image information by using the image region attribute information included in the first code; and converting the first code into the second code including the capture image information and the animation information.

10. The method of claim 9, wherein creating the capture image includes creating the capture image by rendering only a part of the application result screen.

11. The method of claim 9, wherein the second code includes no animation code.

12. The method of claim 7, wherein performing the still image encoding includes performing the still image encoding of the capture image by using the still image compression technique corresponding to one of portable network graphics (PNG), paletted PNG, and joint photography experts group (JPEG).

13. A non-transitory computer readable recording medium having, recorded thereon, a computer program executing the method of claim 7.

14. A cloud streaming system comprising: a cloud streaming server comprising:

a processor;

a memory storing instructions thereon, the instructions when executed by the processor cause the processor to;

receive a first code corresponding to an application result screen from a web application server;

capture an image by using image region attribute information included in the first code;

convert the first code to a. second code including, animation information created using an animation code in the first code, wherein the animation information includes a type of animation to be applied to the still-image-encoded capture image, a duration during which the animation is applied, an animation repetition count, a start coordinate, an end coordinate a start size, and an end size; and perform a cloud streaming service based on a still. image by transmitting, to a user terminal, the capture image still-image-encoded by using a still image compression technique and the second code; and the user terminal configured to:

receive an application execution result screen corresponding to the cloud streaming server from the cloud streaming server display the captured image; and apply the animation to the capture image according to the animation information of the second code.

* * * * *